Aug. 27, 1968     F. HOLLENTON     3,398,823
ARTICLE TRANSFER DEVICE
Filed Nov. 10, 1966     2 Sheets-Sheet 1
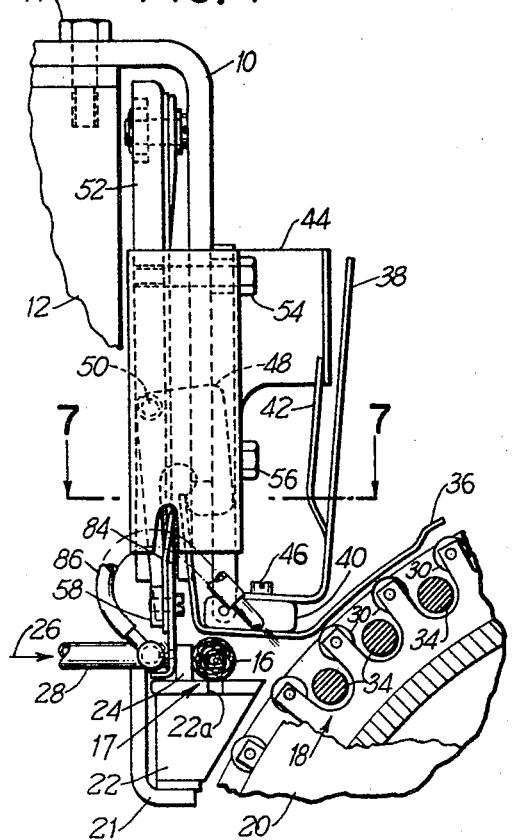
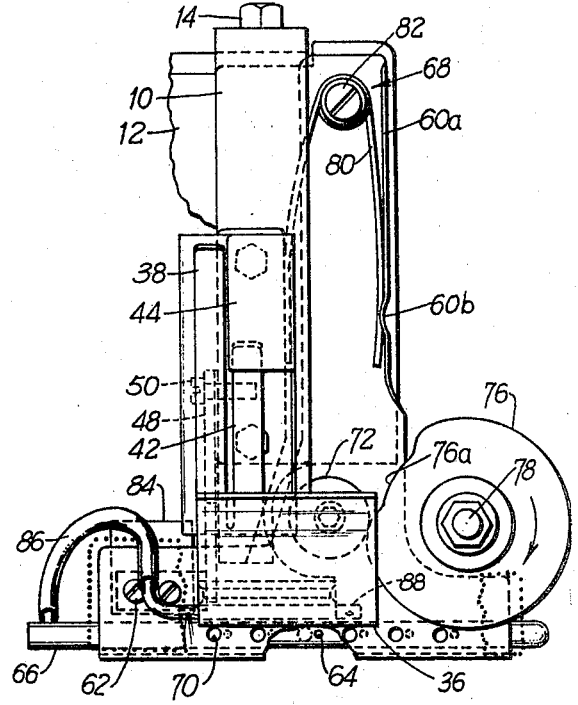
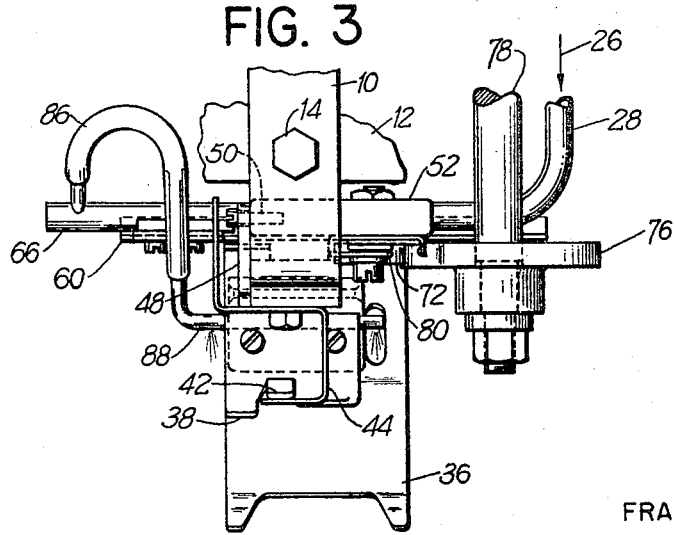
INVENTOR.
FRANK HOLLENTON
BY
*Murray Schaff*
ATTORNEY

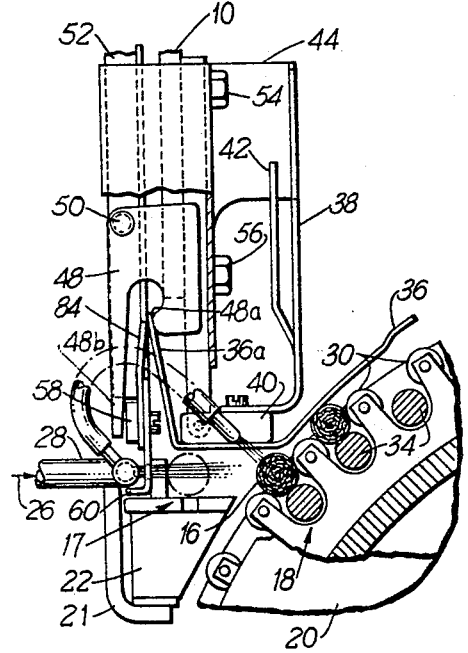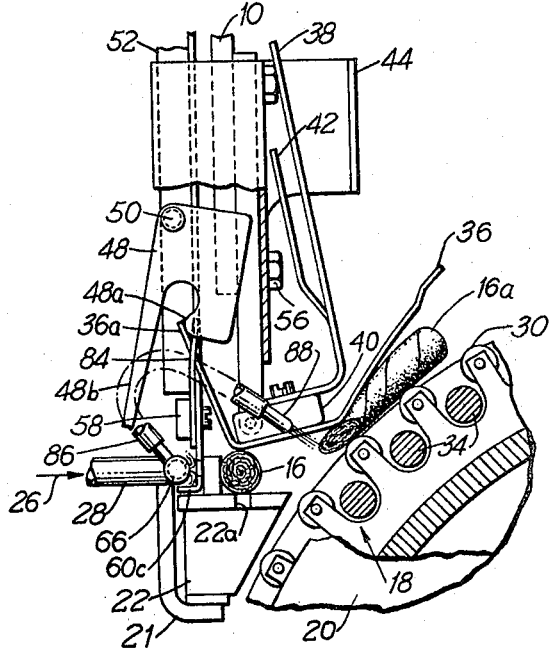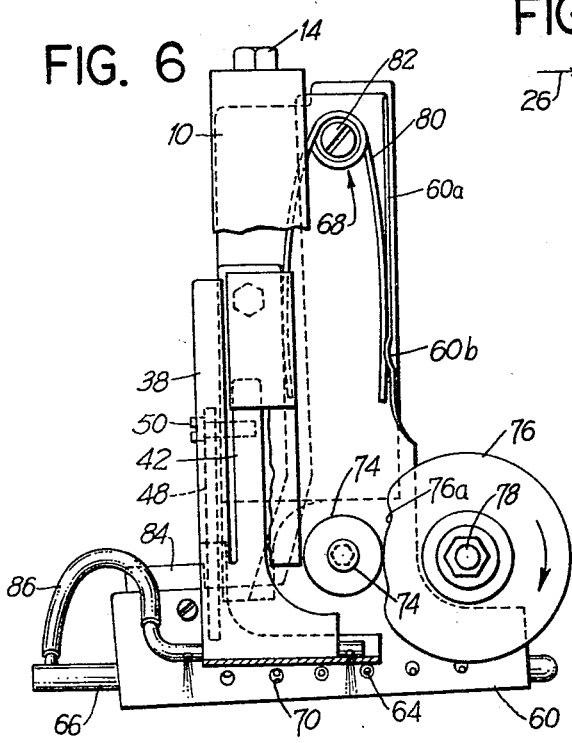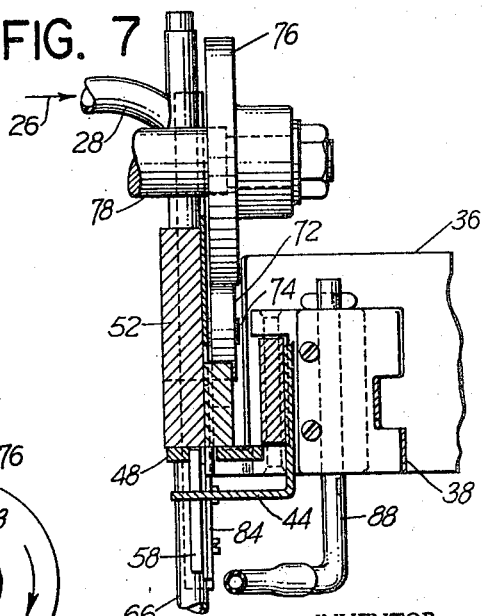

United States Patent Office 3,398,823
Patented Aug. 27, 1968

3,398,823
ARTICLE TRANSFER DEVICE
Frank Hollenton, Mountainside, N.J., assignor to American Machine & Foundry Company, a corporation of New Jersey
Filed Nov. 10, 1966, Ser. No. 593,434
4 Claims. (Cl. 198—22)

ABSTRACT OF THE DISCLOSURE

Mechanism for transferring cigarettes from a longitudinally moving path into a perpendicularly moving conveyor including pneumatic means for propelling the cigarette and means for controlling the pneumatic means.

The present invention relates to a method and apparatus for pneumatically separating and transferring cigars or cigarettes blanks, supplied from a high speed source, into a laterally moving assembly drum or roller conveyor and prepositioning them for further processing.

In the manufacture of cigars or cigarettes, individual blanks are generated at a relatively high rate and moved end-to-end, along an axial path from a making machine to a second machine or attachment of filter tips or mouthpieces. The movement of the blanks, situated end-to-end, is conveniently referred to as a cut rod. Heretofore, the separating and transferring of the individual blanks from the rod flow path, was accomplished by mechanical linkages which were subject to wear and frequent jamming. Furthermore, due to their complexity, with respect to design and number of parts, such linkages and mechanisms of the prior art were difficult and costly to maintain. The precision required in the separating and transferring of individual blanks, was also not always attainable with such mechanical means in high speed machines.

Accordingly, it is an object of the present invention to provide an apparatus and method for pneumatically separating and transferring cigars or cigarette blanks from a high rate of rod flow, into a laterally moving assembly drum or roller conveyor and effecting their positioning for further processing.

Another object of the present invention is to provide an arrangement for separating cigars or cigarette blanks from a high rate of flow in the form of a continuously advancing rod, and transferring them for purposes of attaching filter tips or mouthpieces to spiral-wrapped or plain cigar blanks.

Yet another object of the present invention is to accomplish the aforementioned separating and transferring functions by applying air jets against the body of the individual blanks.

Still another object of the present invention is to provide apparatus and method for controlling automatically the aforementioned separating and transferring functions in relation to the rate of flow of the continuously advancing rod.

Another object of the present invention is to provide apparatus and method for accomplishing the transferring function, described supra, so that the blank does not become misaligned during transfer and thereby lead to jamming conditions.

Yet another object of the present invention is to provide apparatus and a method whereby a jammed condition is immediately detected and further operation of the apparatus is discontinued thereupon.

A further object of the present invention is to provide apparatus and method whereby the apparatus automatically ceases to operate when the supply of blanks has been expended.

A yet further object of the present invention is to provide apparatus which is of simple design and construction and which may be readily manufactured.

A still further object of the present invention is to provide apparatus which has a high degree of reliability of operation, and may be maintained economically.

The novel features which are considered as characteristic of the invention are set forth in the appended claims. The invention itself, however, both as to its additional objects and advantages thereof, will be best understood from the following description of specific embodiments when read in connection with the accompanying drawings, in which:

FIG. 1 is a side elevational view, and shows the apparatus in its nonoperating position, prior to the commencement of processing the cigar or cigarette blanks or when their supply from a making machine (not shown) has been exhausted;

FIG. 2 is a front elevational view of the apparatus of FIGURE 1, with the processing drum omitted, and shows the manner in which the flow of air against the individual cigar or cigarette blanks is controlled;

FIG. 3 is a plan view of the arrangement of FIGURE 2;

FIG. 4 is a partial side elevational view, of the apparatus with a portion of the cover broken away, and shows the state of the apparatus in its normally operating condition;

FIG. 5 is a partial side elevational view, corresponding to the arrangement of FIGURE 4, and shows the relationship of the parts of the apparatus when a jammed condition prevails;

FIG. 6 is a front elevational view of the apparatus, similar to that of FIGURE 2, to show the operating parts, when in the state of supplying an air stream against the individual cigar or cigarette blanks;

FIG. 7 is a partial cross-sectional plan view taken along line 7—7 in FIGURE 1, and shows the details of the parts for controlling the pneumatic operation.

Referring to the drawing, the apparatus includes a mounting bracket 10 for supporting the operating elements in the proper relationship and alignment to the members for processing the cigars or cigarettes. The mounting bracket 10 may be secured to a neighboring machine member 12 through a bolting arrangement 14. Individual cigar or cigarette blanks 16 are supplied to the apparatus in the form of a continuously advancing rod wherein the blanks 16 have been precut and are situated end-to-end and in contact with each other. At the proper and predetermined instant of time, each individual blank 16 is received at a feeding station 17 and is transferred to a seating arrangement 18 in a moving conveyor drum 20, as hereinafter disclosed. The latter conveyor 20 receives the blank and is adapted to convey it to further processing stations where filter tips or mouthpieces may be attached. The feeding station comprises a bracket support 21, work table 22, having an aligning slot 22a and a guide block 24 adapted to properly align each blank upon arrival at the feeding station. At this point a low pressure stream of air 26 is applied to the blank 16 transferring it from its position on the table 22, into the opposed seating arrangement 18 on a processing drum 20. The air stream is continuously supplied to the apparatus through the pneumatic tubing 28, in a manner to be further discussed.

Each seating arrangement 18, on the drum 20, includes three rollers typically represented by alternating roller elements 30, and 34. The three rollers are arranged with one of rollers 34 between and below opposed pairs of rollers 30 to form the cavity or seat for receiving the blanks 16. The rollers have highly polished surfaces which function to seat the blank 16 properly in the cavity when it is blown thereinto by the stream of air 26. When seated within the cavity, formed by the rollers, the blank 16 is in line contact with each of the rollers. This serves to locate the blank properly since a cylindrical surface is determined by three parallel lines. The construction and operation of drum 20 is believed to require no further discussion since such apparatus is well known in the art.

A detector assembly is provided which is adapted to inhibit any flow of air across the table 22 in the non-operating state of the apparatus, and/or when no blanks reside within the cavity of the seating arrangement 18, and/or when said apparatus jams, as hereinafter described.

The detector assembly comprises a forward blade member 36 overlying the drum 20, a central portion connected to an operating lever 38, through a pivotable hinge member 40 and a rear upstanding arm 36a. The assembly of parts 36, 38 and 40, is mounted and designed so that its center of gravity tends to move the detector blade 36 downward towards the rollers 30 so as to sense the presence of a blank or blanks within the cavity 18 of drum 20. The operating lever 38 is provided with a tongue 42 which rests against a portion of the lever positioner and cover 44, when the apparatus is in the non-operating state as shown in FIGURE 1. The tongue 42 serves as a stop member which limits the downward motion of the detector blade 36, so that the latter may closely approach, but not contact, the surfaces of rollers 30, avoiding abrading, scoring or other wear of rollers 30 when the conveyor drum 20 is rotating in the non-operating state. A threaded fastener 46 serves to secure the operating lever 38 and tongue 42, as well as blade 36, to the hinge 40.

To commence operation of the apparatus, the operating lever 38 is manually moved towards the lever positioner and cover 44, so that tongue 42 is removed from its resting area thereon, and the detector blade 36 is lifted away from the rollers 30. The state of the apparatus under these conditions is shown in FIGURE 4. When the operating lever 38 is thus held in position, the air stream 26 is permitted to act upon the blank 16 as described later, and force it into a cavity of the seating arrangement 18. When such blanks are once seated at the surface of the drum 20, they serve to support the detector blade 36 in its operating position, away from the rollers 30, and it is no longer necessary to manually support the operating lever 38. The continuous feeding of the blanks 16 into the seating arrangement 18 functions to maintain the detector blade 36 supported and to retain, thereby, the apparatus in its operating state.

Movable with the detector blade 36, is a control trigger 48. The latter is pivoted about a pin 50 and contacts the detector blade 36 with a contact portion 48a. The control trigger 48 is designed and constructed so that its center of gravity is displaced from the pivot 50 creating a torque thereabout so that the contact portion 48a is always retained in physical contact with the detector blade 36. This particular construction has the desirable advantage of operating without the aid of springs. By operating without such elements, therefore, a substantially high degree of reliability in operation is realized.

The air flow across table 22 is controlled by a pivotable gating mechanism 60 continuously oscillating in front of the air supply and is latched or unlatched by operation of control trigger 48. The control trigger 48 is supported, at its pivot 50, by the apparatus frame 52 which is, in turn, secured to the mounting bracket 10 by means of the bolts 54 and 56. The control trigger 48 is provided with an arm 48b which functions to block or release mechanism 60 by engaging with a control latch 58 secured to the air gate 60 with the fasteners 62.

The air gate 60, serving as a valve, regulates the flow of air from jets 64 in an air manifold 66 extending across table 22 and in communication with air supply 26. The air gate 60 is rotatable about a pivot 68, and includes a plurality of openings 70 corresponding to the air jets or openings 64 in the manifold 66. Through movement of the air gate 60 it is possible to fully obstruct the air leaving the jet openings 64, as shown in FIGURE 2, or to provide a free path by which the air in the manifold 66 streams through the jet openings 64 and the air gate openings 70, as shown in FIGURE 6.

FIGURE 6 shows the configuration when the air gate is in the open position and air is permitted to stream through the jet openings 64 to act upon the cigar or cigarette blanks positioned on the table 22. Due to the rotational character of the air gate 60, the openings 64 are not concentrically aligned with the openings 70 in the air gate, as shown in FIGURE 6, when the apparatus is in the operating state. Since the air gate is pivoted so that the openings 70 are colinear with the openings 64, when the air gate is closed as shown in FIGURE 2, they assume the nonconcentric relationship when the air gate is open, as shown in FIGURE 6.

In normal, continuous, operation, the air gate 60 is oscillated between its open and closed position to permit air flow across the table 22 only when a blank is at the feeding station, through the application of a continuously rotating cam 76 and follower arrangement 72. As seen in FIGURE 6, the follower 72 is freely rotatable about a pin 74 fixedly secured to the air gate 60, and cam 76 secured to a driving shaft 78, which is connected to the machine drive means (not shown). A hinge-type spring 80 mounted on a pivot 68, with a fastening member 82, is provided to retain the follower 72 in contact with the operating surface of the cam 76. One arm of the spring 80 bears against the frame structure of the apparatus, and the other arm of the spring acts on a lip 60a of the air gate having a curved portion 60b in which the spring is seated. The cam 76 is synchronously driven at a speed related to and dependent upon the movement of the continuously advancing rod of cut blanks along the table 22 and is timed and phased with respect to the continuously advancing rod of blanks 16 so that when a blank is properly positioned on the table 22, for transfer to the conveyor drum 20, the lower portion 76a of the cam is brought in contact with the follower 72 to open the air gate 60. At all other times the follower is in contact with the high portion 76b of the cam, whereby the air gate is in its closed position.

The base of the air gate 60 has a bent portion 60c enveloping part of the manifold 66. This bent portion 60c serves to reduce air leakage between the manifold and the air gate by deflecting the air away from table 22 when the air gate is in closed position. On the other hand substantially all of the available air is directed against the blank 16 when the air gate is open.

The air gate 60 has, as described supra, a control latch 58 secured to it. When the apparatus is in the operating state, the arm 48b of the control trigger resides outside of the oscillatory path of the control latch, i.e., the lower end of the arm 48b lies to the left of the control latch 58 when viewed in FIGURE 4. This orientation of the arm 48b results from the tendency of the control trigger 48 to follow and retain contact with the detector blade 36 at its contact portion 48a.

When, however, the apparatus enters a non-operating state, for example as shown in FIGURE 1, in which the detector blade falls or moves towards the rollers 30, the lower end of the arm 48b moves into the path of the control latch 58. This action occurs during the time interval when the follower 72 is in contact with the high portion 76b of the cam. As a result, follower 72, because of its fastening to gate 60 is thereafter held in that position and inhibited from dropping to the lower portion 76a of the cam. This blocking action of the arm 48b, therefore, serves to maintain the air gate closed, and to allow the cam 76 to rotate freely without action upon the follower 72. To return the air gate to its operative state, it is only necessary to move the operating lever 38 into the position shown in FIGURE 4; that is, upwards, to rotate the detector blade 36 away from rollers 30. This action causes the control trigger 48, which maintains contact with the blade, to move the arm 48b out of the path of motion of the control latch 58.

During the high speed operation of the apparatus, it is possible that a cigar or cigarette blank does not become properly seated within the cavity of the arrangement 18, and as a result it is carried by the moving drum 20 so that it is squeezed between the detector blade 36 and the rollers 30, as shown in FIGURE 5. When this condition prevails the apparatus is in a state of jam, and it is desirable to suspend any further operation to prevent damage to it, or the further injection of blanks 16 into the drum 20. This is accomplished by termination of the air flow across the table 22 by blocking movement of the air gate 60 in the closed position, as shown in FIGURE 5. This is realized through the motion of the detector blade 36 when the jam condition occurs. The jamming blank 16a caught between the detector blade 36 and the rollers 30 causes a relatively large rotation of the arm 36a associated with the blade 36. Since the control trigger 48 is designed to follow the motion of the arm 36a and to maintain contact therewith, the jammed blank 16a and the weight of trigger 48 causes the arm 36a to be brought into the path of motion of a jam latch 84, the air gate 60 is inhibited from following the action of the cam 76 with respect to opening of the air jets 64 in a similar manner as the action of trigger 48b.

When a jam condition prevails, therefore, the arm 36a functions as a block against the oscillatory motion of the latch 84 and prevents the air gate 60 from being moved into the open position to apply jets of air against blanks 16 that may be fed to the station and onto the table 22. This blocking action during a jam condition is similar to that described above with regard to the nonoperating state of the apparatus, when the arm 48b blocks the motion of the control latch 58.

A jam condition may be readily relieved by removing the jamming blank 16a from between the surface of the detector blade 36 and the roller 30 at the surface of the drum 20. When the jamming blank 16a is thus removed, the detector blade 36 moves downward to its position as when cigarettes are absent from the turret and prior to start up, or in its operating position as shown in FIGURE 4. Should there be no blanks in rollers 30, the detector blade 36 may drop too far and bring the arm 48b into the blocking position with respect to the control latch 58. Normal operation of the apparatus may be then initiated by moving the operating lever 38 upward, as described supra. If, however, the jam condition is relieved at an instant when a blank 16 is positioned on the table 22 in front of the air gate, so that the blank is immediately injected into a compartment at the surface of the drum 20, the detector blade 36 will be supported by the injected blank, and it will be unnecessary to apply the sequence of steps for restarting the operation of the apparatus.

As an aid in seating blanks in rollers 30, a portion of the air 26 is diverted into an auxiliary manifold 86. The auxiliary manifold 86 is connected to manifold 66 and terminates in a nozzle or jet assembly 88 aimed at the conveyor drum 20. The nozzle or outlet 88 is oriented so that air is applied at right angles into the seating arrangement 18 into which the blank 16 is transferred from the supporting table 22. A blank 16, blown across the table 22, might become somewhat misaligned during this action. However, the auxiliary stream of air from the outlet 88 would cause the blank to realign itself and become properly seated within the cavity of the seating arrangement 18.

While the invention has been illustrated and described as embodied in air actuating assemblies for tobacco products, it is not intended to be limited to the details shown, since various modifications and structural changes may be made without departing in any way from the spirit of the present invention.

I claim:
1. In a cigar, cigarette or similar product processing machine in which said product is fed successively along a longitudinal pathway to a compartmented conveyor traveling in a direction perpendicular to the path of said product, a transfer device comprising means for locating the leading product with respect to a compartment of said conveyor, pneumatic means associated with said locating means having a source of air and a manifold for causing said air to flow against said leading product and for acting thereon to transfer said leading product from the feeding path to said conveyor, said device having gating means movably mounted with respect to said manifold for diverting air flow therefrom, operating means connected to said gating means for moving the same into and out of the path of said air flow, detector means disposed with respect to said conveying means for detecting the absence of or fault in the seating of a product thereon, means for obstructing the movement of the gating means in the path of flow of said air, and means linking said detector to said obstructing means for effecting diversion of the air flow from said manifold in the absence of a product in said conveyor.

2. An arrangement as defined in claim 1 including first and second latch means secured to said gating means, said linking means engaging said first latch means to block said gating means from being operated by said cam as a result of the absence of a product on the conveyor and said linking means engaging said second latch means as a result of there being a fault in the seating of a product on the conveyor.

3. An arrangement as defined in claim 1 including auxiliary pneumatic means directed against said conveyor and offset from the primary pneumatic means for aiding the product to be seated thereon after being transferred from said locating means to said conveyor.

4. In a cigar, cigarette or similar product processing machine in which said product is fed successively along a longitudinal pathway to a compartmented conveyor drum rotating in a direction perpendicular to the path of said product, said conveyor drum having a plurality of spaced parallel pockets for receiving product therein, a transfer device comprising supporting means for said product adjacent said conveyor drum, means for locating the leading product with respect to one of the pockets in said conveyor drum, pneumatic means comprising a source of air and a primary manifold having a plurality of apertures situated adjacent said locating means, said pneumatic means being adapted to blow said leading product into a conveyor pocket, a secondary manifold situated at an angle to said locating means and in a position for blowing air directly into said conveyor pocket, gating means pivotally mounted in front of said primary manifold, said gating means having a plurality of apertures therein corresponding to the apertures in said primary manifold, means for periodically pivoting said gating means to cause said apertures therein and said apertures in the primary manifold to register in alignment or misalignment, means comprising a cam follower mounted on said gating means, said follower being in contact with a cam connected to the drive means of said machine to operate in relation to the feeding of said leading product to said locating means to cause pivoting of said gating means to align said apertures, said gating means being formed with latching devices for engagement to prevent movement thereof when said apertures are misaligned, a mechanical detector associated with said drum to detect the absence of or a fault in the lie of product in the compartments of said conveyor drum, an arm member linked to and actuable by said detecting means for engaging said latch means in the event of the absence of or a fault in the lie of product in said conveyor drum.

(References on following page)

References Cited

UNITED STATES PATENTS

| | | | |
|---|---|---|---|
| 2,002,045 | 5/1935 | Ruau. | |
| 2,357,659 | 9/1944 | Johanson et al. | |
| 2,374,326 | 4/1945 | Bourland | 198—232 |
| 3,158,251 | 11/1964 | Skala et al. | 198—32 |
| 3,180,505 | 4/1965 | Maurer | 214—1 X |

FOREIGN PATENTS

| | | |
|---|---|---|
| 400,145 | 10/1933 | Great Britain. |
| 778,043 | 7/1957 | Great Britain. |

EVON C. BLUNK, *Primary Examiner.*

M. L. AJEMAN, *Assistant Examiner.*